United States Patent [19]

Rody et al.

[11] 4,234,728

[45] Nov. 18, 1980

[54] POLYALKYLPIPERIDINE DERIVATIVES OF S-TRIAZINE

[75] Inventors: Jean Rody, Riehen; Godwin Berner, Basel, both of Switzerland

[73] Assignee: Ciba-Geigy Corporation, Ardsley, N.Y.

[21] Appl. No.: 972,146

[22] Filed: Dec. 21, 1978

[30] Foreign Application Priority Data

Dec. 30, 1977 [CH] Switzerland ................ 16297/77
Aug. 31, 1978 [CH] Switzerland ................ 9199780/78

[51] Int. Cl.³ ............... C07D 251/46; C07D 251/52; C07D 251/64; C07D 401/12
[52] U.S. Cl. ............... 544/198; 544/209; 544/212; 528/258; 528/248; 260/45.8 NT; 525/509; 542/416; 542/417; 542/413
[58] Field of Search ............... 544/198, 209, 212; 542/416, 417, 413; 528/258, 248; 260/45.8 NT; 525/509

[56] References Cited

U.S. PATENT DOCUMENTS

| | | | |
|---|---|---|---|
| 3,925,376 | 12/1975 | Chalmers et al. | 260/248 CS |
| 3,988,292 | 10/1976 | Moriga et al. | 544/198 |
| 4,086,204 | 4/1978 | Cassandrini | 544/198 |
| 4,108,829 | 8/1978 | Cassandrini | 544/198 |
| 4,161,592 | 7/1979 | Evans | 544/209 |

FOREIGN PATENT DOCUMENTS 2642446  3/1978  Fed. Rep. of Germany.
2801470  7/1978  Fed. Rep. of Germany.

*Primary Examiner*—John M. Ford
*Attorney, Agent, or Firm*—Joseph F. DiPrima; Harry Falber

[57] ABSTRACT s-Triazine derivatives which contain, as substituents in the 2-, 4- and 6-position, at least one polyalkylpiperidine radical and at least one N-methylolamino group or an ether thereof, are effective stabilisers for plastics, in particular against light degradation. By virtue of their N-methylol group, they are able to enter into a chemical bond with many plastics and this renders them stable to migration and elution.

9 Claims, No Drawings

POLYALKYLPIPERIDINE DERIVATIVES OF S-TRIAZINE

The invention relates to novel polyalkylpiperidine derivatives of s-triazines and their use as stabilisers for plastics.

s-Triazine derivatives which have substituents containing at least one polyalkylpiperidine radical are known from German Offenlegungsschrift No. 2,319,816. These compounds are effective stabilisers for plastics, in particular against light degradation. For specific applications, however, these triazine derivatives have too high a volatility and tendency to migrate. This is in particular the case when the plastic is used in thin layers, for example in fibres, films or lacquers, and stabilisation over a relatively long period is required.

Attempts have therefore been made to increase the molecular weight of such triazine-piperidine derivatives and thereby to lower their volatility and tendency to migrate. In German Offenlegungsschrift No. 2,636,130, for example, it is proposed to link several piperidine-substituted triazine radicals via a polyvalent compound, for example a polyamine. In German Offenlegungsschrift No. 2,636,144, piperidine-substituted polycondensation products of difunctional triazine derivatives are proposed as stabilisers. Polytriazines of this type also form a physical mixture with the stabilised plastic and can be removed from this mixture again, for example by extraction. This is of practical utility, for example, in the weathering of plastics outdoors or in solvent-resistant coatings and lacquers.

The object of the invention is to provide stabilisers which are based on piperidine-triazines and which can enter into a chemical bond with the polymer to be protected and thus cannot be removed from the plastic either by migration or by elution.

It has been possible to achieve this object by the preparation of novel s-triazine derivatives which contain, as substituents in the 2-, 4- and 6-position, at least one polyalkylpiperidine radical and at least one N-methylolamino group, or the ethers thereof. These compounds can be mono- or polytriazines.

Accordingly, the invention concerns in particular compounds of the formula I or II

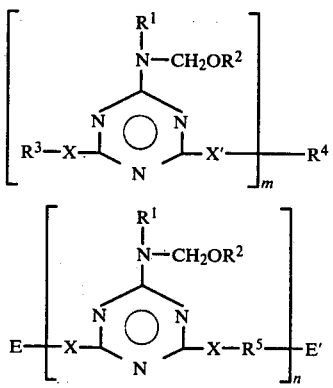

in which m is an integer from 1 to 4 and n is a value from 2 to 50, X and X' are —O—, —S— or —NR$^6$—, in which R$^6$ is hydrogen, C$_1$–C$_{18}$ alkyl, C$_3$–C$_8$ alkenyl, C$_1$–C$_4$ hydroxyalkyl, C$_2$–C$_{13}$ alkoxyalkyl, C$_5$–C$_{12}$ cycloalkyl, C$_6$–C$_{10}$ aryl, C$_7$–C$_9$ phenylalkyl or a polyalkylpiperidine group of the formula III

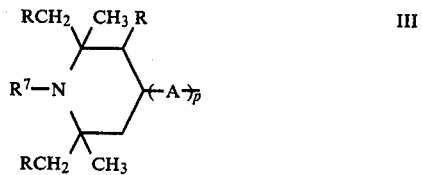

in which R is hydrogen or methyl, p is 0 or 1, A is C$_1$–C$_4$-alkylene, —NR$^6$—C$_2$—C$_{12}$-alkylene- or —OCH$_2$CH$_2$CH$_2$— and R is H, O, C$_1$–C$_{12}$-alkyl, allyl, benzyl or a —CH$_2$CH(R$^8$)—OH group, in which R$^8$ is H, CH$_3$, C$_2$H$_5$ or phenyl, and R$^1$ and R$^3$ are hydrogen, C$_1$–C$_{18}$ alkyl, C$_3$–C$_8$ alkenyl, C$_1$–C$_4$ hydroxyalkyl, C$_2$–C$_{13}$ alkoxyalkyl, C$_5$–C$_{12}$ cycloalkyl, C$_6$–C$_{10}$ aryl, C$_7$–C$_9$ phenylalkyl, phenyl or phenylalkyl which is substituted by 1 or 2 C$_1$–C$_8$ alkyl groups and/or OH and/or C$_1$–C$_4$ alkoxy, or a polyalkylpiperidine group of the formula III, R$^2$ is hydrogen, C$_1$–C$_{18}$ alkyl, C$_3$–C$_8$ alkenyl, C$_2$–C$_6$ hydroxyalkyl or C$_3$–C$_6$ alkoxyalkyl, R$^4$, if m is 1, is hydrogen, C$_1$–C$_{18}$ alkyl, C$_3$–C$_8$ alkenyl, C$_2$–C$_4$ hydroxyalkyl, C$_3$–C$_6$ alkoxyalkyl, C$_5$–C$_{10}$ aryl, C$_7$–C$_9$ phenylalkyl, phenyl or phenylalkyl which is substituted by 1 or 2 C$_1$–C$_8$ alkyl groups and/or OH and/or C$_1$–C$_4$ alkoxy, or a polyalkylpiperidine group of the formula III, and if m is 2 is C$_2$–C$_{12}$ alkylene or oxaalkylene, C$_4$–C$_{12}$ alkenylene, C$_6$–C$_{10}$ arylene, a -phenylene-Z-phenylene-radical, in which Z is —O—, —S—, —SO$_2$—, —CH$_2$— or —C(CH$_3$)$_2$—, or a radical of the formula —(CH$_2$)$_r$—NY—(CH$_2$)$_r$—NY$_q$(CH$_2$)$_r$—, wherein r is 2 or 3 and q is 0 or 1 and Y is a triazinyl group of the formula IV,

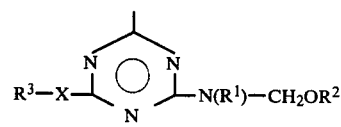

and if m is 3 is a R$^8$—C(CH$_2$—)$_3$ radical, in which R$^8$ is C$_1$–C$_4$ alkyl, and if m is 4 is a C(CH$_2$—)$_4$ radical, R$^5$ is C$_2$–C$_{12}$ alkylene and E and E' are corresponding end groups and at least one of the radicals R$^1$, R$^3$, R$^4$ or R$^6$ is a piperidine radical of the formula III.

These compounds are able, by virtue of their >N—CH$_2$OR$^2$ groups, to enter into a chemical reaction with the polymeric substrates if the latter possess a reactive group. Reactive groups are groups with labile hydrogen atoms, i.e. in particular OH and NH groups. If R$^2$ is hydrogen or if R$^1$, R$^2$, R$^3$, R$^4$ or R$^6$ is hydroxyalkyl, the compounds of the formula I and II can also react with groups which are capable of reaction with OH, for example epoxide groups or isocyanate groups. The compounds of the formula I and II are therefore suitable in particular for stabilising polymers or prepolymers which have reactive groups, for example melamine, urea or alkyd resins, polyurethanes, crosslinkable acrylic resins or epoxide resins. However, the compounds of the formula I and II are also suitable for stabilising polymers which do not have any reactive groups. In this case they are in the form of a physical mixture and at elevated temperature can self-condense, which results in a further increase in the size of the molecule.

In the formulae I and II, $R^1$, $R^2$, $R^3$, $R^4$ and $R^6$ can be $C_1$–$C_{18}$ alkyl; this can be unbranched or branched alkyl, for example methyl, ethyl, propyl, isopropyl, butyl, sec.-butyl, tert.-butyl, hexyl, octyl, 2-ethylhexyl, decyl, dodecyl, tetradecyl or octadecyl.

$R^1$, $R^2$, $R^3$, $R^4$ and $R^6$ can be $C_3$–$C_8$ alkenyl; this can be unbranched or branched, for example allyl, methallyl, 2,2-dimethyl-but-3-enyl or 2-vinylpropyl.

$R^1$, $R^3$ and $R^6$ as $C_1$–$C_4$ hydroxyalkyl can be, for example, hydroxymethyl, 2-hydroxyethyl, 2-hydroxypropyl, 3-hydroxypropyl or 2-hydroxybutyl. $R^2$ and $R^4$ can be the same radicals with the exception of hydroxymethyl.

$R^1$, $R^3$ and $R^6$ as $C_2$–$C_{13}$ alkoxyalkyl can be, in particular, alkoxymethyl, alkoxyethyl and alkoxypropyl, for example methoxymethyl, butoxymethyl, octyloxymethyl, methoxyethyl, hexyloxyethyl or ethoxypropyl. $R^2$ and $R^4$ as $C_3$–$C_6$ alkoxyalkyl can be in particular, alkoxyethyl.

$R^1$, $R^3$ and $R^6$ as cycloalkyl can be, for example, cyclopentyl, cyclohexyl, methylcyclohexyl, cyclooctyl, cyclodecyl, or cyclododecyl.

$R^1$, $R^3$, $R^4$ and $R^6$ as $C_6$–$C_{10}$ aryl can be phenyl or naphthyl.

$R^1$, $R^3$ and $R^4$ as substituted phenyl can be, for example, tolyl, ethylphenyl, tert-butylphenyl, methoxyphenyl, hydroxyphenyl, isopropoxyphenyl, 3,5-di-tert-butyl-4-hydroxyphenyl or 2,4-dimethylphenyl.

$R^1$, $R^3$, $R^4$ and $R^6$ as $C_7$–$C_9$ phenylalkyl can be, for example, benzyl, phenylethyl or phenylpropyl.

$R^4$ and $R^5$ as $C_2$–$C_{12}$ alkylene or oxaalkylene can be, for example, 1,2-ethylene, 1,1-ethylene, 1,2-propylene, 1,4-butylene, 1,1,3-trimethyl-1,4-butylene, 3-oxa-1,5-pentylene, 1,6-hexylene, 4-oxa-1,7-heptylene, 1,8-octylene or 1,12-dodecylene.

$R^4$ as $C_4$–$C_{12}$ alkylene can be, for example, 1,4-but-2-enylene or 1,6-hex-3-enylene.

$R^4$ as $C_6$–$C_{10}$ arylene can be, for example, phenylene or naphthylene.

In the compounds of the formula I, m is an integer from 1 to 4 and $R^4$ is a m-valent radical. The compounds are thus unitary compounds.

The compounds of the formula II, on the other hand, are oligomers or polymers which are usually obtained as a mixture in which the degree of polymerisation n varies. The degree of polymerisation n, which can be ascertained by determining the molecular weight, is therefore an average value and can be a decimal number (for example 5.6). Depending on the method used to determine the molecular weight, the average value can be a number-average or weight-average.

The end groups E and E' result from the method of preparation. E can be, for example, hydrogen, alkyl or HX—$R^5$—; E' is preferably —XH.

Preferred compounds of the formulae I and II are those in which R is hydrogen. Further preferred compounds of the formula I or II are those in which X and X' are a —$NR^6$— group.

Preferred compounds of the formula I are those in which m is 1 or 2, X and X' are a —$NR^6$— group, in which $R^6$ is hydrogen, $C_3$–$C_8$ alkyl, $C_1$–$C_2$ hydroxyalkyl, $C_2$–$C_4$ alkoxyalkyl, cyclohexyl, benzyl or a polyalkylpiperidine group of the formula III, $R^1$ and $R^3$ are hydrogen, $C_1$–$C_4$ alkyl, $C_1$–$C_2$ hydroxyalkyl, $C_2$–$C_3$ alkoxyalkyl or a piperidine radical of the formula III, in which p is nought, R is hydrogen and $R^7$ is hydrogen, $C_1$–$C_4$ alkyl or hydroxyethyl, $R^2$ is hydrogen, $C_1$–$C_4$ alkyl or allyl and $R^4$, if m is 1, is hydrogen, $C_1$–$C_4$ alkyl, hydroxyethyl, benzyl or a piperidine radical of the formula III, and, if m is 2, is $C_2$–$C_6$ alkylene, -phenylene-$CH_2$-phenylene or a radical —$CH_2CH_2$—NY$+CH_2CH_2$—NY$]_q$$CH_2CH_2$—, in which q is nought or 1 and Y is a triazinyl group of the formula IV.

Preferred compounds of the formula II are those in which n is 2 to 10, X is a —$NR^6$— group, in which $R^6$ is hydrogen, $C_3$–$C_8$ alkyl, $C_1$–$C_2$ hydroxyalkyl, $C_2$–$C_4$ alkoxyalkyl, cyclohexyl, benzyl or a polyalkylpiperidino group of formula III, $R_1$ is hydrogen, $C_1$–$C_4$-alkyl, $C_1$–$C_2$ hydroxyalkyl, $C_2$–$C_3$ alkoxyalkyl or a piperidine radical of the formula III, in which p is nought, R is hydrogen and $R^7$ is hydrogen, $C_1$–$C_4$ alkyl or hydroxyethyl, $R^2$ is hydrogen, $C_1$–$C_4$ alkyl or allyl and $R^5$ is $C_2$–$C_8$ alkylene.

Examples of compounds of the formula I in which m=1 are the compounds in the following table:

| $R^1$ | $R^2$ | $R^3$ | $R^4$ | X | X' |
|---|---|---|---|---|---|
| H | H | —$C_4H_9$ | —$C_4H_9$ | 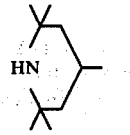 | |
| —$CH_2OCH_3$ | —$CH_3$ | —$C_2H_5$ | —$C_2H_5$ | 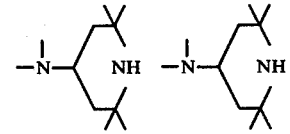 | |
| H | —$C_2H_5$ | (HN-piperidinyl) | —$CH_2OC_2H_5$ | 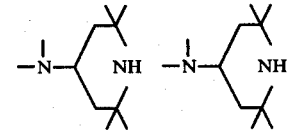 | —NH— |

-continued

| R¹ | R² | R³ | R⁴ | X | X' |
|---|---|---|---|---|---|
| —CH₂OH | H | (2,2,6,6-tetramethylpiperidin-4-yl)—OCH₂CH₂CH₂— | —CH₂OH | —NH— | —N(—CH₂OH)— |
| —CH₂OCH₃ | —CH₃ | (1,2,2,6,6-pentamethylpiperidin-4-yl) | (1,2,2,6,6-pentamethylpiperidin-4-yl) | —O— | —O— |
| H | —CH₂CH=CH₂ | (2,2,6,6-tetramethylpiperidin-4-yl)—CH₂CH₂— | (2,2,6,6-tetramethylpiperidin-4-yl)—CH₂CH₂— | —NH— | —NH— |
| H | —C₄H₉ | —CH₃ | —CH₃ | —N(—(2,2,6,6-tetramethylpiperidin-4-yl))— NH | —N(—(2,2,6,6-tetramethylpiperidin-4-yl))— NH |
| H | —CH₃ | —C₂H₅ | (2,2,6,6-tetramethylpiperidin-4-yl)—CH₂CH₂— | —N(—C₂H₅)— | —N(—(2,2,6,6-tetramethylpiperidin-4-yl))— NH |
| —CH₂OCH₃ | —CH₃ | (2,2,6,6-tetramethylpiperidin-4-yl) | —CH₂—C(CH₃)₂—CH₂—(3,5-di-t-butyl-4-hydroxyphenyl) | —N(—C₄H₉)— | —NH— |

Examples of compounds of the formula I in which m=2 are the compounds with the following substituents:

| R¹ | R² | R³ | R⁴ | X | X' |
|---|---|---|---|---|---|
| H | CH₃ | C₂H₅ | —(CH₂)₆— | —N(C₂H₅)— | —N(—(2,2,6,6-tetramethylpiperidin-4-yl))—NH |
| H | C₂H₅ | (2,2,6,6-tetramethylpiperidin-4-yl) | —(CH₂)₆— | (2,2,6,6-tetramethylpiperidin-4-yl)—N— | —NH— |

Examples of compounds of the formula II are the following compounds:

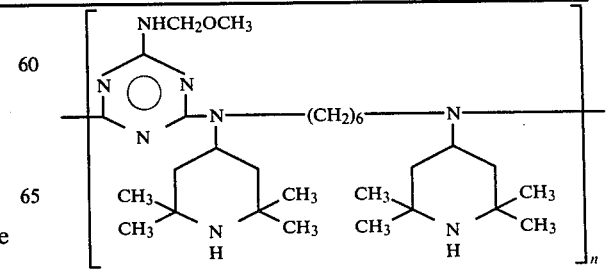

60

-continued

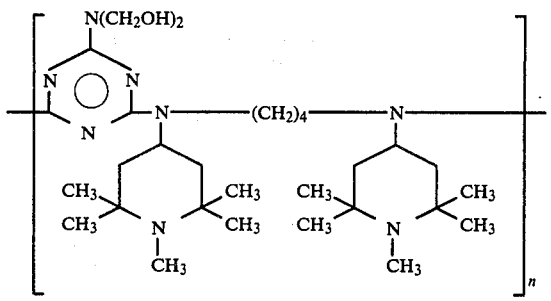

The compounds of the formulae I and II can be prepared by known methods. The compounds of the formula I can be prepared, for example, from cyanuric acid chloride by stepwise replacement of the chlorine atoms by the radicals $R^3X$—, $R^4X'$— and —$NH_2$ or —$NHR^1$ and subsequent introduction of the —$CH_2OR^2$ group. The —$CH_2OR^2$ group is introduced by reacting the corresponding aminotriazine compound with formaldehyde by the general method of Gams, Widmer and Fisch (Helv. Chim. Acta 24 (1941) 1). If the reaction with formaldehyde is carried out in an aqueous medium, the N-methylol compounds ($R^2$=H) are formed, whilst if the reaction is carried out in alcohols in the presence of acids, the corresponding N-alkoxymethyl compounds ($R^2$=alkyl) are obtained. The latter compounds can, however, also be obtained by etherification of the methylol compounds. Further details can be taken from the examples.

The compounds of the formula II can be prepared by reacting 1-amino-3,5-dichlorotriazine with a difunctional compound HX—$R^5$—XH and subsequent reaction of the reaction product with formaldehyde. If an excess of the compound HX—$R^5$—XH is used, there are obtained relatively low molecular weight compounds of the formula II in which the end group E is HX—$R^5$— and E' is XH. If a stoichiometric amount of the compound HX—$R^5$—XH is used, there are obtained products with higher molecular weight which in addition contain chlorine end groups. During the subsequent reaction with formaldehyde, these chlorine end groups are converted to $R^2O$ end groups (E=H or alkyl). The hydrogen chloride formed during the polycondensation reaction is neutralised by addition of organic or inorganic bases. The resulting salt is removed by washing with water.

The products of the formulae I and II have good stability to hydrolysis. They are readily soluble in most organic polymers and even in small concentrations effect stabilisation of the polymers against ageing, especially against photochemical degradation. Examples of polymers which are usually damaged by the action of light and can be stabilised by the addition of compounds of the formula I or II are:

1. Polymers of mono- and di-olefins, for example polyethylene (which can be crosslinked), polypropylene, polyisobutylene, polymethylbut-1-ene, polymethylpent-1-ene, polyisoprene or polybutadiene.
2. Mixtures of the polymers mentioned under (1), for example mixtures of polypropylene with polyethylene or with polyisobutylene.
3. Copolymers of mono- and di-olefins, for example ethylene/propylene copolymers, propylene/but-1-ene copolymers, propylene/isobutylene copolymers and ethylene/but-1-ene copolymers and also terpolymers of ethylene with propylene and a diene, such as hexadiene, dicyclopentadiene or ethylidenenorbornene.
4. Polystyrene.
5. Copolymers of styrene or α-methylstyrene with dienes or acrylic derivatives, for example styrene/butadiene, styrene/acrylonitrile or styrene/acrylonitrile/methyl acrylate; mixtures of high impact strength obtained from styrene copolymers and another polymer, for example a polyacrylate, a diene polymer or an ethylene/propylene/diene terpolymer; and also block copolymers of styrene, for example styrene/butadiene/styrene, styrene/isoprene/styrene or styrene/ethylene-butylene/styrene.
6. Graft copolymers of styrene, for example styrene on polybutadiene, styrene and acrylonitrile on polybutadiene and mixtures thereof with the copolymers listed under (5), such as those known as ABS polymers.
7. Halogen-containing polymers, for example polyvinyl chloride, polyvinylidene chloride, polyvinyl fluoride, polychloroprene, chlorinated rubbers and copolymers such as vinyl chloride/vinylidene chloride, vinyl chloride/vinyl acetate or vinylidene chloride/vinyl acetate.
8. Polymers which are derived from α,β-unsaturated acids and their derivatives, such as polyacrylates and polymethacrylates, polyacrylamides and polyacrylonitrile.
9. Polymers which are derived from unsaturated alcohols and amines or their acyl derivatives or acetals, such as polyvinyl alcohol; polyvinyl acetate, polyvinyl stearate, polyvinyl benzoate, polyvinyl maleate, polyvinylbutyral, polyallyl phthalate, polyallylmelamine and their copolymers with other vinyl compounds, such as ethylene/vinyl acetate copolymers.
10. Homo- and co-polymers of epoxides, such as polyethylene oxide, polypropylene oxide or their copolymers with bis-glycidyl ethers.
11. Polyacetals, such as polyoxymethylene, and also those polyoxymethylenes which contain ethylene oxide as the comonomer.
12. polyphenylene oxides.
13. Polyurethanes and polyureas.
14. Polycarbonates.
15. Polysulphones.
16. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.
17. Polyesters which are derived from dicarboxylic acids and dialcohols and/or from hydroxycarboxylic acids or the corresponding lactones, such as polyethylene terephthalate, polybutylene terephthalate and poly-1,4-dimethylolcyclohexane terephthalate, and also block polyetheresters which are derived from polyethers with hydroxyl end groups and dicarboxylic acids.
18. Crosslinked polymers which are derived from aldehydes on the one hand and from phenols, ureas and melamines on the other hand, such as phenol-formaldehyde resins, urea-formaldehyde resins and melamine-formaldehyde resins.
19. Alkyd resins, such as glycerol/phthalic acid resins and their mixtures with melamine-formaldehyde resins.
20. Unsaturated polyester resins which are derived from copolyesters of saturated and unsaturated dicarboxylic acids with polyhydric alcohols and vinyl compounds as crosslinking agents, and also their halogen-containing modifications of low combustibility.

21. Crosslinked epoxide resins which are derived from polyepoxides, for example from bis-glycidyl ethers or from cycloaliphatic diepoxides.

22. Natural occurring polymers, such as cellulose and rubber, and also their polymer-homologously chemically modified derivatives, such as cellulose acetates, cellulose propionates and cellulose butyrates and the cellulose ethers, such as methylcellulose.

Amongst these polymers, groups 13, 18, 19, 20, 21 and 22 are of particular importance because they contain polymers which can react with the —$CH_2OR^2$ groups of the stabilisers of the formulae I and II and which can be used for lacquers and coating materials. Acrylic resins which can be made crosslinkable by chemical modification are suitable for this purpose.

The reaction of the stabilisers with the polymers can be catalysed by the acid hardening catalysts known, for example, for the curing of melamine resins. Examples of such hardening catalysts are organic carboxylic acids, sulphonic acids or ammonium salts.

The stabilisers according to the invention are added to the polymers in an amount of 0.01 to 5% by weight, based on the polymer. Preferably 0.02 to 1% by weight is used. The stabiliser is added before shaping of the plastic. This addition can be effected by dry mixing of the pulverulent materials or by mixing with a solution or melt of the polymer. The stabiliser can also be mixed into prepolymers or a solution thereof. Such prepolymers are used in particular as surface-coating resins, as coating compositions or as compression moulding compositions, which convert to the crosslinked, high-molecular state only during or after shaping.

Simultaneously with the admixture of the stabiliser of the invention, it is also possible to mix in those other additives conventionally employed in the processing of plastics. Such additives are, for example, pigments, fillers, plasticisers, detergents, glass fibres, fluorescent whitening agents, other stabilisers, flame retardants or antistatic agents.

When concurrently employing other known stabilisers, synergistic effects can be obtained; a co-stabiliser effect of this type can result, for example, with light stabilisers based on benzotriazole or based on nickel compounds.

The plastics stabilised in this way can be used in very diverse forms, for example as films, fibres, tapes, compression moulding compositions, coating compositions or paints. Their use as binders for lacquers is of particular importance.

EXAMPLE 1

31 g of 2,4-bis-[N-(2,2,6,6-tetramethyl-4-piperidyl)-butyl(amino)]-6-amino-1,3,5-triazine (the starting material can be obtained in accordance with German Offenlegungsschrift No. 2,319,816) are dissolved in 100 ml of glacial acetic acid. After addition of 15 ml of 37% formaldehyde solution, the reaction mixture is stirred for 20 hours at room temperature, diluted with 200 ml of water and made strongly alkaline with concentrated sodium hydroxide solution. The precipitated product is collected by filtration, washed with water and dried over calcium chloride in an exsiccator. The resultant 2,4-bis-[N-(2,2,6,6-tetramethyl-4-piperidyl)-butylamino]-6-dimethylolamino-1,3,5-triazine melts at 79°–80° C.

EXAMPLE 2

54.3 g of 2,4,6-tris-(2,2,6,6-tetramethyl-4-piperidylamino)-1,3,5-triazine are dissolved in 200 ml of glacial acetic acid. After addition of 20 ml of 36% formaldehyde solution, the reaction mixture is stirred for 18 hours at room temperature, then diluted with water, made strongly alkaline with concentrated sodium hydroxide solution and extracted with toluene. The toluene solution is dried over sodium sulphate and concentrated in vacuo. Crystallisation of the residue yields 2,4-bis-(2,2,6,6-tetramethyl-4-piperidylamino)-6-(2,2,6,6-tetramethyl-4-piperidyl-methylolamino)-1,3,5-triazine in the form of colourless crystals with a melting point of 201°–202° C.

EXAMPLE 3

18.9 g of 2,4-bis-ethylamino-6-[N-(2,2,6,6-tetramethyl-4-piperidyl)-N-butylamino]-1,3,5-triazine are stirred with 20 ml of 36% formaldehyde solution in 100 ml of glacial acetic acid for 24 hours at room temperature. The reaction mixture is diluted with 200 ml of water and made strongly alkaline with concentrated sodium hydroxide solution. The precipitated resinous product is washed with water and dried over calcium chloride in an exsiccator, yielding 2,4-bis-N-methylol-ethylamino-6-[N-(2,2,6,6-tetramethyl-4-piperidyl)-butylamino]-1,3,5-triazine in the form of a colourless, slightly tacky substance.

EXAMPLE 4

20 g of 2,4-bis-[N-(2,2,6,6-tetramethyl-4-piperidyl-$\beta$-hydroxyethylamino]-6-tert-octylamino-1,3,5-triazine are dissolved in 100 ml of glacial acetic acid and, after addition of 20 ml of 36% formaldehyde solution, the reaction mixture is stirred for 20 hours at 45° C. The reaction mixture is worked up as described in Example 3, affording 2,4-bis-[N-(2,2,6,6-tetramethyl-4-piperidyl)-3-hydroxyethylamino]-6-N-methylol-tert-octylamino-1,3,5-triazine in the form of a colourless powder with a melting point of 130° C.

EXAMPLE 5

19 g of 2,4-bis-[N-(2,2,6,6-tetramethyl-4-piperidyl)-$\beta$-hydroxyethylamino]-6-N-methylol-tert-octylamino-1,3,5-triazine (compound of Example 4) are stirred 24 hours at 50° C. in 200 ml of methanol with the addition of 10 ml of concentrated hydrochloric acid. After cooling, the reaction mixture is made alkaline with concentrated sodium hydroxide solution and taken up in toluene/butanol (1:1). The solution is dried over sodium sulfate and concentrated in vacuo. The residue is subsequently dried for 12 hours at 60° C. in a high vacuum, affording 2,4-bis-[N-(2,2,6,6-tetramethyl-4-piperidyl)-3-hydroxyethylamino]-6-N-methoxymethyl-tert-octylamino-1,3,5-triazine in the form of a slightly yellowish, solid resin which sinters at about 105° C.

EXAMPLE 6

25 g of 2,4-bis-N-methylol-ethylamino-6-[N-2,2,6,6-tetramethyl-4-piperidyl)-butylamino]-1,3,5-triazine (product of Example 3) are stirred for 20 hours at room temperature in 150 ml of methanol and 10 ml of concentrated hydrochloric acid. The reaction solution is neutralised with sodium bicarbonate, the salt is collected by filtration and the methanol solution is concentrated in vacuo. The residue is recrystallised from toluene/ligroin, affording 2,4-bis-N-methoxymethyl-ethylamino- 6-[N-(2,2,6,6-tetramethyl-4-piperidyl)-butylamino]-1,3,5-triazine in the form of colourless crystals which slowly decompose above 200° C.

EXAMPLE 7

40.1 g of N,N'-bis-(2,2,6,6-tetramethyl-4-piperidyl)-N,N'-bis-[2-amino-4-(2,2,6,6-tetramethyl-4-piperidyl-butylamino)1,3,5-triazin-6-yl]-hexamethylenediamine (m.p. 170°-171° C.) are dissolved in 200 ml of methanol with the addition of 20 ml of concentrated hydrochloric acid. After addition of 6 g of paraformaldehyde, the reaction mixture is stirred for 18 hours at room temperature, neutralised with sodium bicarbonate and extracted with toluene. The toluene solution is dried over sodium sulphate and concentrated in vacuo. The residue is dried for 12 hours at 60° C. in a high vacuum, yielding N,N'-bis-(2,2,6,6-tetramethyl-4-piperidyl)-N,N'-bis-[2-dimethoxymethylamino-4-(2,2,6,6-tetramethyl-4-piperidyl-butylamino)-1,3,5-triazin-6-yl]-hexamethylenediamine in the form of a slightly yellowish substance which begins to sinter from 98° C.

What is claimed is:

1. A compound of the formula I or II

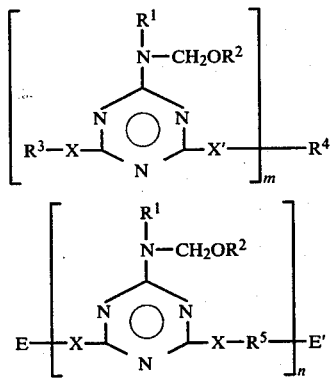

in which m is an integer from 1 to 4 and n is a value from 2 to 50, X and X' are —O—, —S— or —NR$^6$—, in which R$^6$ is hydrogen, C$_1$-C$_{18}$ alkyl, C$_3$-C$_8$ alkenyl, C$_1$-C$_4$ hydroxyalkyl, C$_2$-C$_{13}$ alkoxyalkyl, C$_5$-C$_{12}$ cycloalkyl, C$_6$-C$_{10}$ aryl, C$_7$-C$_9$ phenylalkyl, or a polyalkylpiperidine group of the formula III

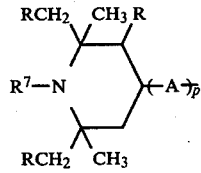

in which R is hydrogen or methyl, p is 0 or 1, A is C$_1$-C$_4$-alkylene, —NR$^6$—C$_2$-C$_{12}$-alkylene- or —OCH$_2$CH$_2$CH$_2$— and R$^7$ is H, O, C$_1$-C$_{12}$-alkyl, allyl, benzyl or a —CH$_2$—CH(R$^8$)—OH group, in which R$^8$ is H, CH$_3$, C$_2$H$_5$ or phenyl, and R$^1$ and R$^3$ are hydrogen, C$_1$-C$_{18}$ alkyl, C$_3$-C$_8$ alkenyl, C$_1$-C$_4$ hydroxyalkyl, C$_2$-C$_{13}$ alkoxyalkyl, C$_5$-C$_{12}$ cycloalkyl, C$_6$-C$_{10}$ aryl, C$_7$-C$_9$ phenylalkyl, phenyl or phenylalkyl which is substituted by one or more substituents from the group consisting of C$_1$-C$_8$ alkyl, OH, C$_1$-C$_4$ alkoxy, and a polyalkylpiperidine group of the formula III, R$^2$ is hydrogen, C$_1$-C$_{18}$ alkyl, C$_3$-C$_8$ alkenyl, C$_2$-C$_6$ hydroxyalkyl or C$_3$-C$_6$ alkoxyalkyl, R$^4$, if m is 1, is hydrogen, C$_1$-C$_{18}$ alkyl, C$_3$-C$_8$ alkenyl, C$_2$-C$_4$ hydroxyalkyl, C$_3$-C$_6$ alkoxyalkyl, C$_6$-C$_{10}$ aryl, C$_7$-C$_9$ phenylalkyl, phenyl or phenylalkyl which is substituted by one or more substituents from the group consisting of C$_1$-C$_8$ alkyl, OH, C$_1$-C$_4$ alkoxy, and a polyalkylpiperidine group of the formula III, and, if m is 2, is C$_2$-C$_{12}$ alkylene or oxaalkylene, C$_4$-C$_{12}$ alkenylene, C$_6$-C$_{10}$ arylene, a -phenylene-Z-phenylene- radical, in which Z is —O—, —S—, —SO$_2$—, —CH$_2$— or —C(CH$_3$)$_2$—, or a radical of the formula —(CH$_2$)$_r$—N(Y)+(CH$_2$)$_r$—N(Y)]$_q$(CH$_2$-)$_r$—, wherein r is 2 or 3 and q is 0 or 1 and Y is a triazinyl group of the formula IV,

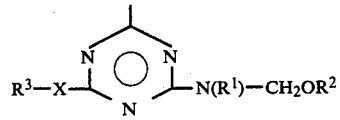

and, if m is 3, is a R$^8$—C(CH$_2$—)$_3$ radical, in which R$^8$ is C$_1$-C$_4$ alkyl, and, if m is 4, is a C(CH$_2$—)$_4$ radical, R$^5$ is C$_2$-C$_{12}$ alkylene and E is hydrogen, alkyl or HX—R$^5$— and E' is XH and at least one of the radicals R$^1$, R$^3$, R$^4$, or R$^6$ is a polyalkylpiperidine of the formula III.

2. A compound according to claim 1, in which R is hydrogen.

3. A compound according to claim 1, in which X and X' are a —NR$^6$— group.

4. A compound according to claim 1 of the formula I, in which m is 1 or 2, X and X' are a —NR$^6$— group, in which R$^6$ is hydrogen, C$_3$-C$_8$ alkyl, C$_1$-C$_2$ hydroxyalkyl, C$_2$-C$_4$ alkoxyalkyl, cyclohexyl, benzyl or a polyalkyl-piperidine group of the formula III, R$^1$ and R$^3$ are hydrogen, C$_1$-C$_4$ alkyl, C$_1$-C$_2$ hydroxyalkyl, C$_2$-C$_3$ alkoxyalkyl or a piperidine radical of the formula III, in which p is nought, R is hydrogen and R$^7$ is hydrogen, C$_1$-C$_4$ alkyl or hydroxyethyl, R$^2$ is hydrogen, C$_1$-C$_4$ alkyl or allyl and R$^4$, if m is 1, is hydrogen, C$_1$-C$_4$ alkyl, hydroxyethyl, benzyl or a polyalkylpiperidine radical of the formula III, and if m is 2 is C$_2$-C$_6$ alkylene, -phenylene-CH$_2$-phenylene or a radical —CH$_2$CH$_2$—N-(Y)+CH$_2$CH$_2$—N(Y)]$_q$CH$_2$CH$_2$—, in which q is nought or 1 and Y is a triazinyl group of the formula IV.

5. A compound according to claim 1, of the formula II, in which n is 2 to 10, X is a —NR$^6$— group, in which R$^6$ is hydrogen, C$_3$-C$_8$ alkyl, C$_1$-C$_2$ hydroxyalkyl, C$_2$-C$_4$ alkoxyalkyl, cyclohexyl, benzyl or a polyalkyl-piperidine group of the formula III, R$^1$ is hydrogen, C$_1$-C$_4$ alkyl, C$_1$-C$_2$ hydroxyalkyl, C$_2$-C$_3$ alkoxyalkyl or a polyalkylpiperidine radical of the formula III, in which p is nought, R is hydrogen and R$^7$ is hydrogen, C$_1$-C$_4$ alkyl or hydroxyethyl, R$^2$ is hydrogen, C$_1$-C$_4$ alkyl or allyl and R$^5$ is C$_2$-C$_8$ alkylene.

6. 2,4-Bis-[N-(2,2,6,6-tetramethyl-4-piperidyl)-butylamino]-6-dimethylolamino-1,3,5-triazine according to claim 1.

7. 2,4-Bis-(N-methylol-ethylamino)-6-[N-(2,2,6,6-tetramethyl-4-piperidyl)-butylamino]-1,3,5-triazine according to claim 1.

8. 2,4-Bis-[N(2,2,6,6-tetramethyl-4-piperidyl)-β-hydroxy-ethylamino]-6-N-methoxymethyl-tert-octylamino-1,3,5-triazine according to claim 1.

9. N,N'-Bis-(2,2,6,6-tetramethyl-4-piperidyl)-N,N'-bis[2-di(methoxymethylamino-4-N-(2,2,6,6-tetramethyl-4-piperidyl)-butylamino-1,3,5-triazin-6-yl]-hexamethylenediamine according to claim 1.

* * * * *